Oct. 29, 1929.  C. B. GAMBLE  1,733,685
GAS VALVE
Filed May 3, 1927  2 Sheets-Sheet 1

INVENTOR
CHARLES B. GAMBLE
By Paul, Paul + Moore
ATTORNEYS

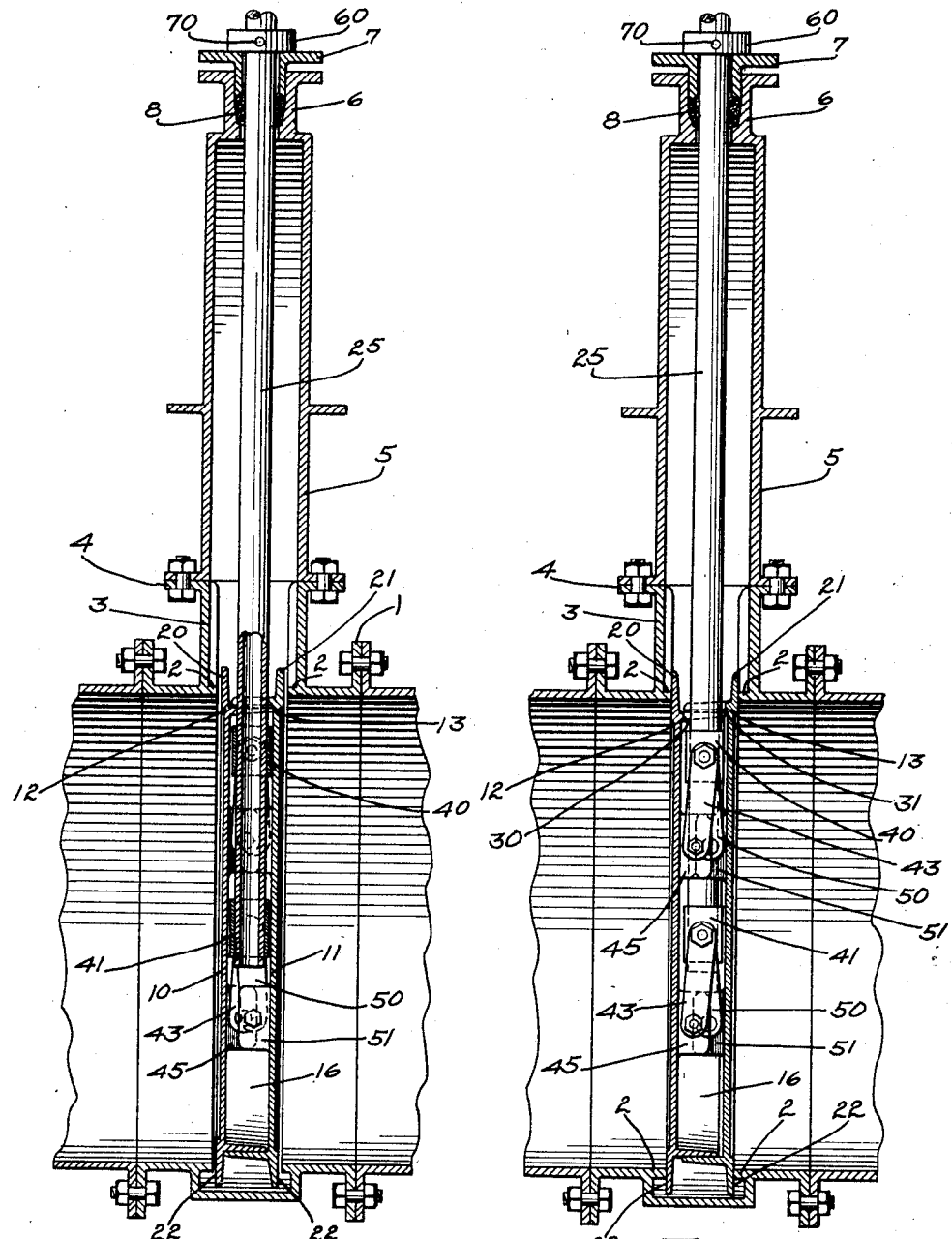

Patented Oct. 29, 1929

1,733,685

UNITED STATES PATENT OFFICE

CHARLES B. GAMBLE, OF MINNEAPOLIS, MINNESOTA

GAS VALVE

Application filed May 3, 1927. Serial No. 188,589.

This invention relates to improvements in gas valves, a general objection of the invention being to provide a valve of this type which will positively prevent leaking, and which can be entirely withdrawn to provide unobstructed flow through the passage which it controls. Another and more particular object is to provide a valve of the above type which may be operated by the expansive force of a fluid introduced between the valve elements to force them in opposite direction to seating position.

Another object of the invention is to provide an element functioning both to translate the members, to a point laterally of the passage to be controlled, and to introduce fluid therebetween. Another object is to provide packing and valve-chamber sealing means through which this valve-operating and fluid-introducing element reciprocates, the element carrying a stop engageable with the packing means to compress the same to prevent leaking, while fluid under pressure is being introduced, the arrangement being such that when the valve is withdrawn from control position, the packing is loosened, thus preventing undue wear of the packing.

Features of the invention include all the details of construction as well as the general arrangement of the parts of the valve and the manner of operating the same.

Other objects and features, along with advantages of the device, will be set forth in the description of the drawings forming a part of this application and in said drawings:

Figure 2 is a vertical section showing the valve in position across the gas line preparatory to closing;

Figure 3 shows the valve closed; and,

Figures 1, 4:
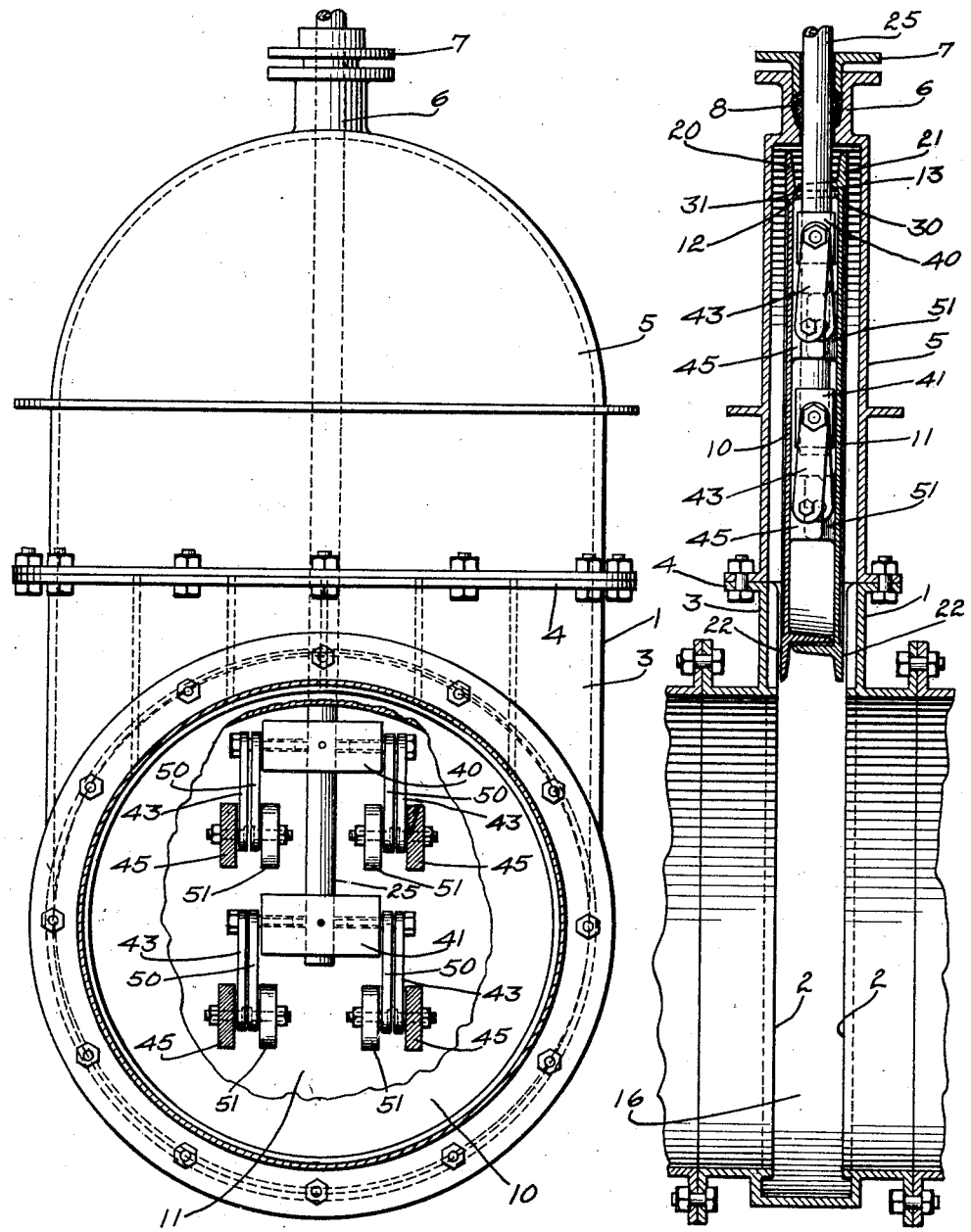
Figure 1 represents an elevation partly in section illustrating the link connection between the valve members and the valve-operating and fluid introducing element.
Figure 4 is a view showing the valve in inoperative position, laterally of the gas line.

The numeral 1 designates a valve casing providing opposingly related annular seats 2 against which the valve members are adapted to seat by travelling in opposite directions. An extension 3 is provided having a suitable terminal flange 4, and this extension together with a second extension 5 forms a chamber into which the valve can be drawn and stored. The extension 5 is provided with a stuffing box 6 having a gland 7 slidable therein, the usual packing 8 being provided.

The valve comprises two members 10—11 in this instance substantially circular, each having a substantially L-shaped cross sectional configuration and respectively providing flanges 12—13 which telescope to form a chamber 16 between the elements. The elements respectively provide flanges 20—21, the outer faces 22 of which engage the seats 2, when the valve is in closed position.

A fluid-introducing element, as a pipe 25, traverses the stuffing box and gland as well as the chamber 5 and extension 3, and enters the chamber 16. The flanges 12 and 13 are suitably notched as at 30—31 to provide for the passage of this pipe 25. This notching permits the elements 10—11 to move inwardly and outward, respectively to unseat and seat the valve members. It will be understood that there is sufficient looseness in the telescopic connection to allow the elements 10—11 to ride inwardly when the pressure is discontinued.

In order that the valve members may be withdrawn, the same are connected with the pipe so that when the pipe is translated in the appropriate direction, the elements 10 and 11 move with it. This connection may be viewed as a loose pendent connection, the idea being to provide that play necessary for the inward and outward movement of the valve member, respectively away from and toward their seats. For this purpose I provide cross heads or blocks 40—41 non-rotatably secured as by pins to the pipe 25, and at each opposite end of each of these cross heads, I attach a pair of links. As herein shown, the links 43, or those at the outer side are connected to lugs 45 carried by the element 10 and the links 50 are connected to lugs 51 secured to the element 11. Thus the elements are attached in a manner to permit the elements 10 and 11 to slightly adjust themselves during opening and closing movements.

By an inspection of Figure 2, it will be seen that as soon as the valve elements have arrived in opposition to their seats, a nut or collar 60 attached as by a pin 70 to the element 25, will be engaged with the slidable gland 7 and the packing 8 will be compressed. Thus the packing is compressed before the fluid is introduced under pressure into the pipe 25. Figure 3 shows the valves seated, and it will be understood that this view illustrates the position of the valve members after the introduction of fluid under pressure. As the fluid introducing and valve operating member 25 travels outwardly, in this case upwardly, the packing 8 will be loosened as the inward pressure on the gland 7 is removed. Thus undue wear of the packing is prevented, while at the same time leaking is prevented during introduction of the fluid.

Applicant's device at present, finds valuable application in water gas producing machines. In these machines considerable waste heat may be utilized for the production of steam in a waste heat boiler. Heretofore it has been found practicable to pass, through the boiler, only the products of combustion made during the blasting period. Inasmuch as the blasting period is usually about forty per cent of the complete cycle, the boiler is making steam only forty per cent of the time, when connected to only one machine, and this connection to only one machine has been the general practice. The cost of maintaining a waste heat boiler is great and if one boiler can be made to produce as much steam as two, there is considerable economic gain. The use of the valve herein permits the connection of two water gas machines with one boiler. A leakage during this gas making period from either or both machines might cause explosion in the boiler when the blast is started on one of the machines. The valve herein operates satisfactorily in the environment above mentioned and acts to positively prevent gas leaking and is so constructed that the operation of opening and closing produces little wear of the valve seats, and the valve when unseated gives sufficiently large clearances so that any sticky deposits on the seat and disks will not cause sticking of the valves.

When the valve is closed, there is a body of steam between the disks at a pressure greater than that of the fluid on either side of the valve. Any leakage between the disks and their seats is a leakage of steam. Unlike the ordinary wedge-operated gate valves which are moving to seating position during movement to place them in seating opposition, the present valve elements only move to seating position after the valves are in proper opposition to their seats. Moreover, in the present valve, when the pressure is released, the disks move by gravity toward one another and away from the seats before they start to move in a direction laterally of the seats. It is to be noted that the steam which is introduced between the disks will leak through the telescopic members and clean them so that they will not stick and will, therefore, properly operate by gravity to unseat. Moreover, steam in such quantity over such large surface area prevents excessive heating of the valve disks.

A valuable feature of the present invention is the arrangement of the disks so that their total transverse dimension, or dimension in an axial direction, when closed or unseated, see Figures 2 and 4, can be made considerably less than the total transverse dimension between the valve seats. Thus when the disks are closed, ample room may be had for the introduction of a cleaning implement. This feature is particularly valuable when the valve is used in the manner above mentioned, that is in a gas line in which rapid accumulation of tarry matter frequently interferes with seating of the valve. The device may be considered an elastic wedge having a wide range of movement in seating and unseating direction, which is in effect compensatory to assure proper seating of the valve at all points. A great advantage over all the ordinary wedge constructions is that the range of movement toward and away from seating position is substantially increased, because the pendent or swinging connections are such that substantial movement of the valves from the position shown in Figures 2 and 4 to seating position is possible, after the valve members are opposed to their seats.

Another advantage is that, if the faces of the valve seats (which are ordinarily parallel with one another) become worn so that this parallel relation no longer exists, the pendent connection of the valve members permits compensatory movements of each valve so that it always properly engages its seat, to form a seal.

I claim as my invention:

1. A device of the class described comprising a casing providing a passage, having two opposingly related valve seats, and a pocket communicating with the passage, a movable valve member interposable between said seats to close the passage and adapted to be withdrawn into the pocket, said valve member comprising sections telescopically connected to provide a chamber therebetween, a pipe passing through the pocket and loosely through the walls of the telescopic sections and into the chamber, and links pendently connecting the telescopic sections to said pipe.

2. A device of the class described comprising a casing, providing a passage having two opposingly related valve seats, and a pocket communicating with the passage adjacent the seats, a movable valve member interposable between said seats to close the passage and adapted to be withdrawn into the pocket, said valve member comprising only two sections, telescopically connected to provide a chamber therebetween, a pipe passing through the pocket and leading into the chamber and supportingly connected with said sections and arranged to deliver fluid therebetween to urge them against said seats.

3. A device of the class described comprising a casing, providing a passage having two opposingly related valve seats, and a pocket communicating with the passage adjacent the seats, a movable valve member interposable between said seats, to close the passage and adapted to be withdrawn into the pocket, said valve member comprising only two sections telescopically connected to provide a chamber therebetween, a pipe passing through said pocket and leading into said chamber, said sections being connected to the pipe to swing toward one another to unseat and provide clearance for withdrawal.

4. A device of the class described comprising a casing, providing a passage having two opposingly related valve seats, and a pocket communicating with the passage adjacent the seats, a packing gland having one of its elements slidable in the casing, a movable valve member interposable between said seats to close the passage and adapted to be withdrawn into the pocket, said valve member comprising two sections connected to provide a chamber therebetween, a pipe passing through the gland and pocket, and leading into the chamber and supportingly connected with said sections and arranged to deliver fluid therebetween to urge them against said seats, said pipe having a projection to engage and translate and thereby cause packing action of the movable gland element only when the valve sections are substantially in position from which they move to seat, and said stop further acting to prevent movement of the valve member beyond this seating position.

5. A device of the class described comprising a casing providing a passage, having two opposingly related valve seats, and a pocket communicating with the passage, a movable valve member interposable between said seats to close the passage and adapted to be withdrawn into the pocket, said valve member comprising two sections telescopically connected to provide a chamber therebetween, a pipe passing through the pocket and leading into the chamber and having loose link connections with said sections and arranged to deliver fluid therebetween to urge them against said seats.

6. A device of the class described, a conduit providing two opposingly related valve seats, a movable valve member interposable between said seats, and comprising two sections telescopically connected, and providing a chamber therebetween, and a conduit leading into said chamber and loosely connected to form the sole support for said sections, and adapted to deliver fluid between the members to expand the same against their seats.

7. A device of the class described comprising a casing providing a passage to be controlled, and two opposingly related valve seats lying perpendicular to the passage, a movable valve member interposed between said seats and adapted to travel in a direction axially of the passage to seating position to close the passage, and comprising two sections telescopically connected and providing a chamber therebetween, a conduit leading into the chamber, connections between the conduit and the sections, said conduit adapted to deliver fluid between the sections to urge the same in opposite direction against their seats, said conduit being connected to the sections to translate them to a position laterally of the passage, the said sections disposed pendently with regard to said conduit.

8. A passage including two opposingly related spaced seats, and a chamber communicating therewith, a pipe sealingly traversing a wall of the chamber, and a pair of valve members connected to telescope one upon the other and to form a chamber which encloses a portion of the pipe, and suspended from the pipe to move by gravity toward one another, to provide clearance for introduction of the valve between the seats and withdrawal from such position, said valves being adapted to swing each in an opposite direction to seat, as the result of introduction of fluid through the pipe.

9. A passage including two opposingly related spaced seats, and a chamber communicating therewith, a pipe sealingly traversing the wall of the chamber, and a pair of valve members connected to telescope one upon the other and to form a chamber which encloses a portion of the pipe, and suspended from the pipe to move by gravity toward one another, and loosely fitted together to provide clearance for introduction of the valve between the seats and withdrawal from such position, said valves being adapted to swing each in an opposite direction to seat, as the result of introduction of fluid through the pipe, the arrangement being such that fluid can leak out of the chamber formed between the valve members.

10. A device of the class described comprising a casing providing a passage having two closely spaced opposingly faced valve seats, and a valve adapted to be freely interposed between the seats and comprising a pair of loosely telescopically connected valve elements adapted to engage the seats by a movement away from one another, and a pipe delivering within the elements, and links connecting the pipe with the valve elements in a manner to allow the elements to swing by gravity toward one another to unseat.

11. A device of the class described comprising a casing providing a passage, said passage having two opposingly related spaced valve seats, a valve member interposable between said seats to close the passage, said valve member comprising two sections loosely, telescopically connected to provide a chamber therebetween, a pipe slidably arranged in the casing and leading loosely between the valve sections to deliver therebetween, and connections between the valve sections and pipe for loosely and pendently supporting said sections for free telescopic movement by gravity away from their seats.

12. A valve element comprising a pair of hollow sections loosely telescopically connected, a pipe passing through the walls of the telescopic sections to deliver at a point between said sections, in a manner to permit movement of both members toward and away from the pipe, and connections between the pipe and sections to permit movement of the pipe and sections in substantially axial direction.

13. A device of the class described comprising a casing providing a passage having two opposingly related valve seats, a packing gland having one of its elements slidable in the casing, a movable valve member interposable between said seats to close the passage, a pipe passing through the gland and pocket and connected to operate the valve by delivering fluid, said pipe having a projection to engage and translate the movable gland element to compress the packing, when the valve section is substantially in the position from which it moves to seat, said stop acting to prevent movement of the valve member beyond its seating position.

14. A device of the class described comprising a casing providing a passage having two opposingly related valve seats, and a pocket communicating with the passage adjacent the seats, a packing gland having one of its elements slidable in the casing, a movable valve member interposable between said seats to close the passage and adapted to be withdrawn into the pocket, a pipe passing through the gland and pocket and connected to operate the valve by delivering fluid, said pipe having a projection to engage and translate the movable gland element to compress the packing when the valve section is substantially in the position from which it moves to seat, said stop acting to prevent movement of the valve member beyond its seating position.

In witness whereof, I have hereunto set my hand this 30th day of April, 1927.

CHARLES B. GAMBLE.